United States Patent [19]
Brinley

[11] Patent Number: 5,231,767
[45] Date of Patent: Aug. 3, 1993

[54] WARP SENSING APPARATUS

[75] Inventor: Charles E. Brinley, Addison, Mich.

[73] Assignee: Anthony Industries, Inc., Adrian, Mich.

[21] Appl. No.: 780,482

[22] Filed: Oct. 22, 1991

[51] Int. Cl.⁵ .......................... G01B 5/20; G01B 5/28
[52] U.S. Cl. ...................................... 33/533; 33/553; 33/522
[58] Field of Search ................. 33/522, 533, 546, 549, 33/551, 553, 554

[56] References Cited

U.S. PATENT DOCUMENTS

| | | | |
|---|---|---|---|
| 2,687,575 | 8/1954 | Acton et al. | 33/522 |
| 2,816,365 | 12/1957 | Pierce | 33/533 |
| 3,073,034 | 1/1963 | Antoszewski | 33/522 |
| 3,125,811 | 3/1964 | Pierce et al. | 33/533 |
| 3,442,019 | 5/1969 | Breitweiser et al. | 33/554 |
| 3,724,084 | 4/1973 | McNeece | 33/533 |
| 3,762,053 | 10/1973 | Day | 33/533 |
| 3,857,185 | 12/1974 | Hoglund | 33/553 |
| 4,233,745 | 11/1980 | Ramon et al. | 33/533 |
| 4,750,141 | 6/1988 | Judell et al. | 33/551 |
| 4,936,018 | 6/1990 | Robinson et al. | 33/522 |

FOREIGN PATENT DOCUMENTS

| | | | |
|---|---|---|---|
| 0280003 | 11/1990 | Japan | 33/533 |
| 0138510 | 6/1991 | Japan | 33/533 |
| 0324235 | 10/1957 | Switzerland | 33/533 |
| 1381328 | 3/1988 | U.S.S.R. | 33/533 |

*Primary Examiner*—Thomas B. Will
*Attorney, Agent, or Firm*—Marshall & Melhorn

[57] ABSTRACT

A warp sensing apparatus for measuring the displacement or warp in disk-shaped objects such as drum lids and the like. A drum lid or other disk-shaped object is centered on the apparatus and clamped at the axis of rotation of the disk-shaped object. After the disk-shaped object is clamped, a contact probe of a transducer is positioned on the surface of the disk-shaped object to measure bidirectional displacement of the contact probe perpendicular to the surface of the disk-shaped object caused by undulations in the surface of the disk-shaped object. A manual rotating wheel permits the disk-shaped object to be rotated. A meter readout on the transducer displays the magnitude and direction of the contact probe displacement caused by undulations in the disk-shaped object as the disk-shaped object is rotated.

9 Claims, 2 Drawing Sheets

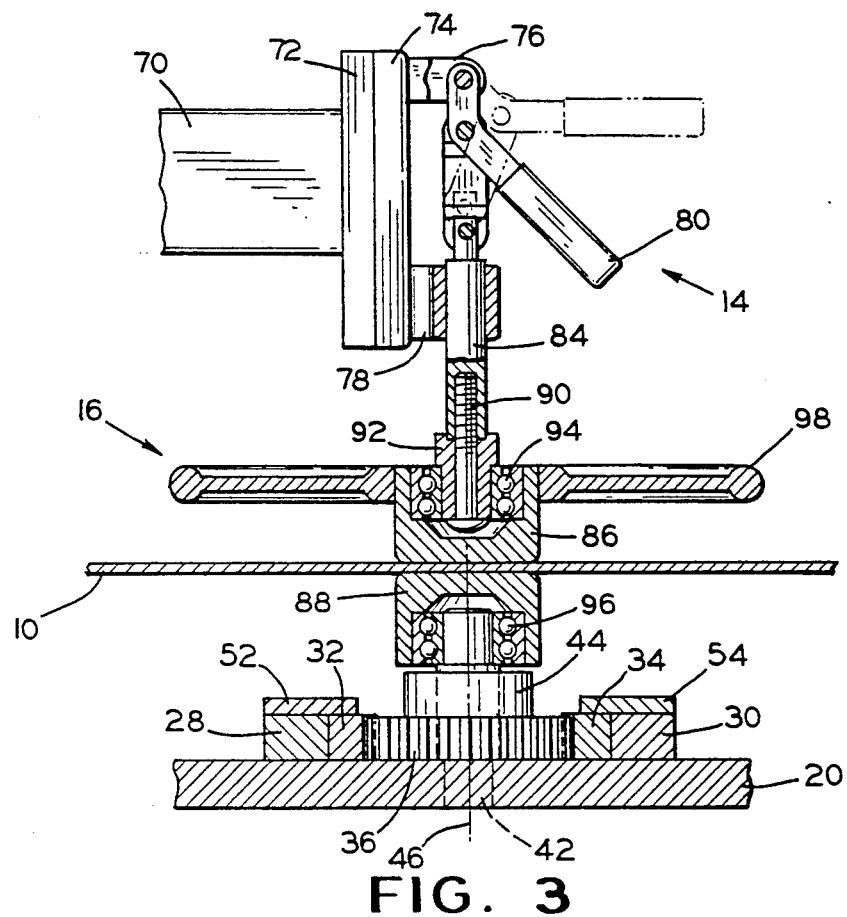
FIG. 3
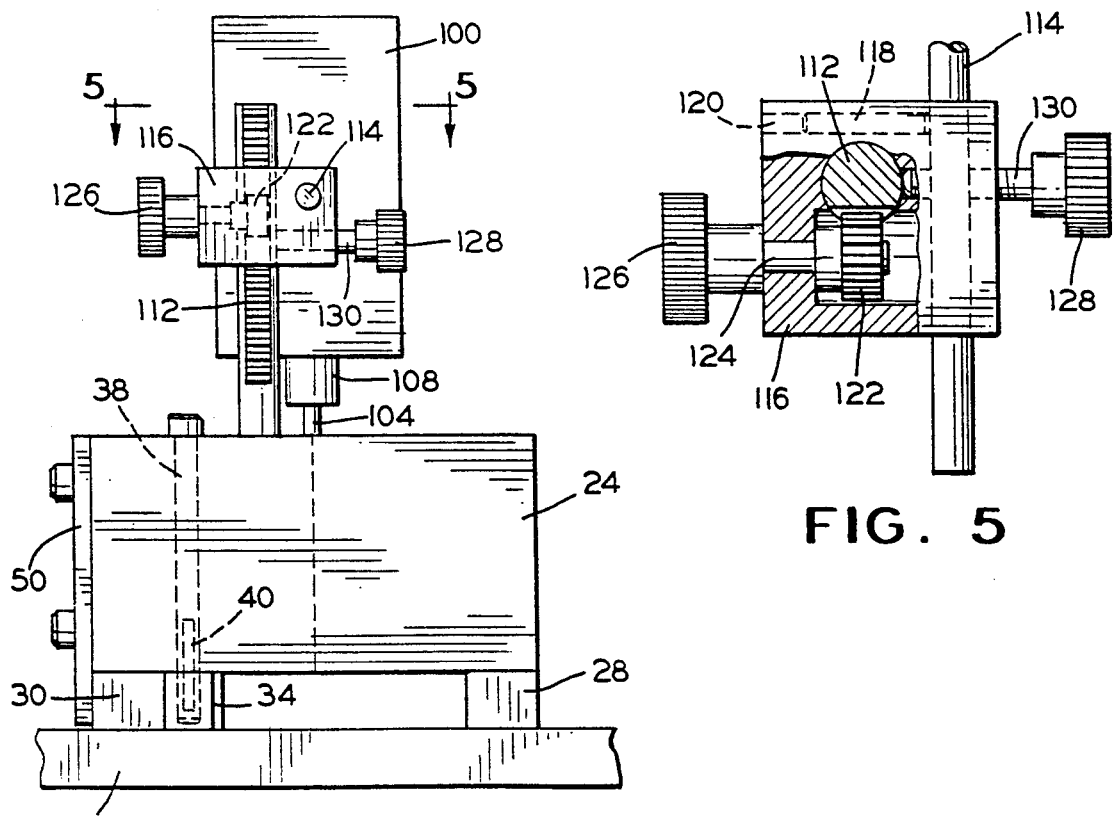
FIG. 5
FIG. 4

WARP SENSING APPARATUS

BACKGROUND OF THE INVENTION

1. Field of the Invention

The present invention pertains to warp sensing apparatus, and more particularly, to apparatus for determining the warp in disk-shaped articles such as drum lids and the like.

2. Description of the Art

Disk-shaped components are used in connection with production processes in many manufacturing applications. Such components may be subject to warping, which typically renders the components unacceptable for use. In the event warped components are used in a manufacturing process, quality problems result in the future use of the product being produced.

One of the applications where a warped component causes substantial quality problems is the production of storage drums, such as laminated fiber board drums. Prior to this time, drum manufacturers have had no easy way to determine whether the lids used in production were warped. Warped lids prevent the drum from sealing properly and can cause leakage or contamination of the material stored in the drum.

One of the most common means used to test for warped lids is by visual inspection and manual measurement. When the drums are being assembled and a worker believes that a lid is warped, the worker simply places the lid on a table or floor and measures the deviation from the horizontal plane by holding a ruler or other measuring instrument perpendicular to the table or floor. In many cases, the worker assembling the drums may not notice that the lids are slightly warped. In addition, an accurate measurement of the deviation or warp of the lid may not be possible because the shape of the lid makes it difficult to hold the lid and take a measurement at the same time.

Electro-mechanical transducers have been used for a number of years to convert basic mechanical dimensions, such as displacement, pressure, vibration, etc. into electrical signals. Transducers are used on a wide variety of equipment applications. None of the applications has provided a simple and cost effective means for determining whether a disk-shaped component is warped. Most manufacturers using disk-shaped components would find it desirable to have an inexpensive and efficient means for determining if the component is warped.

SUMMARY OF THE INVENTION

In accordance with the present invention, there is provided a warp sensing apparatus for testing a drum lid or other disk-shaped component to determine whether or not such component is warped. The apparatus consists essentially of a centering mechanism for positioning the disk-shaped object to be tested, a clamping means for rotatably mounting the object, a rotating means for rotating the object, and a transducer or other sensing means for measuring the displacement of the object as the object is rotated.

The disk-shaped object to be tested is placed in the centering mechanism on the warp sensing apparatus and is centered to insure that the disk-shaped object is clamped on the axis of rotation in the center of the disk-shaped object's primary plane. Once the clamp is in place, the centering mechanism is released to permit the disk-shaped object to rotate about the axis of rotation The contact probe of the transducer is then positioned on the edge of the disk-shaped object and an initial point of reference is established The disk-shaped object is rotated to measure positive or negative displacement from the initial setting.

The transducer is typically provided with a readout which shows the positive or negative displacement of the edge of the disk-shaped object as the disk-shaped object is rotated past the contact probe. The transducer is mounted on a support arm extending from a centering block of the centering mechanism The centering block moves the transducer to the edge of the disk-shaped object as part of the centering process. After the disk-shaped object is centered, a rack and pinion mechanism on the support arm permits the transducer and contact probe to be properly positioned. A set screw on the rack and pinion mechanism locks the transducer and contact probe in the proper position to obtain accurate measurements of displacement.

The present invention provides a fast and convenient means for determining if a disk-shaped object is warped and provides an accurate readout of the displacement which occurs during the test. Such information can than be used for a variety of purposes, including quality control and analysis.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is an enlarged sectional view taken along line 3—3 of FIG. 1;

FIG. 4 is a sectional view taken along line 4—4 of FIG. 2; and

FIG. 5 is a sectional view taken along line 5—5 of FIG. 4 with portions cut away to more clearly illustrate the transducer support arm adjustment mechanism.

DESCRIPTION OF THE PREFERRED EMBODIMENT

Figure 1:
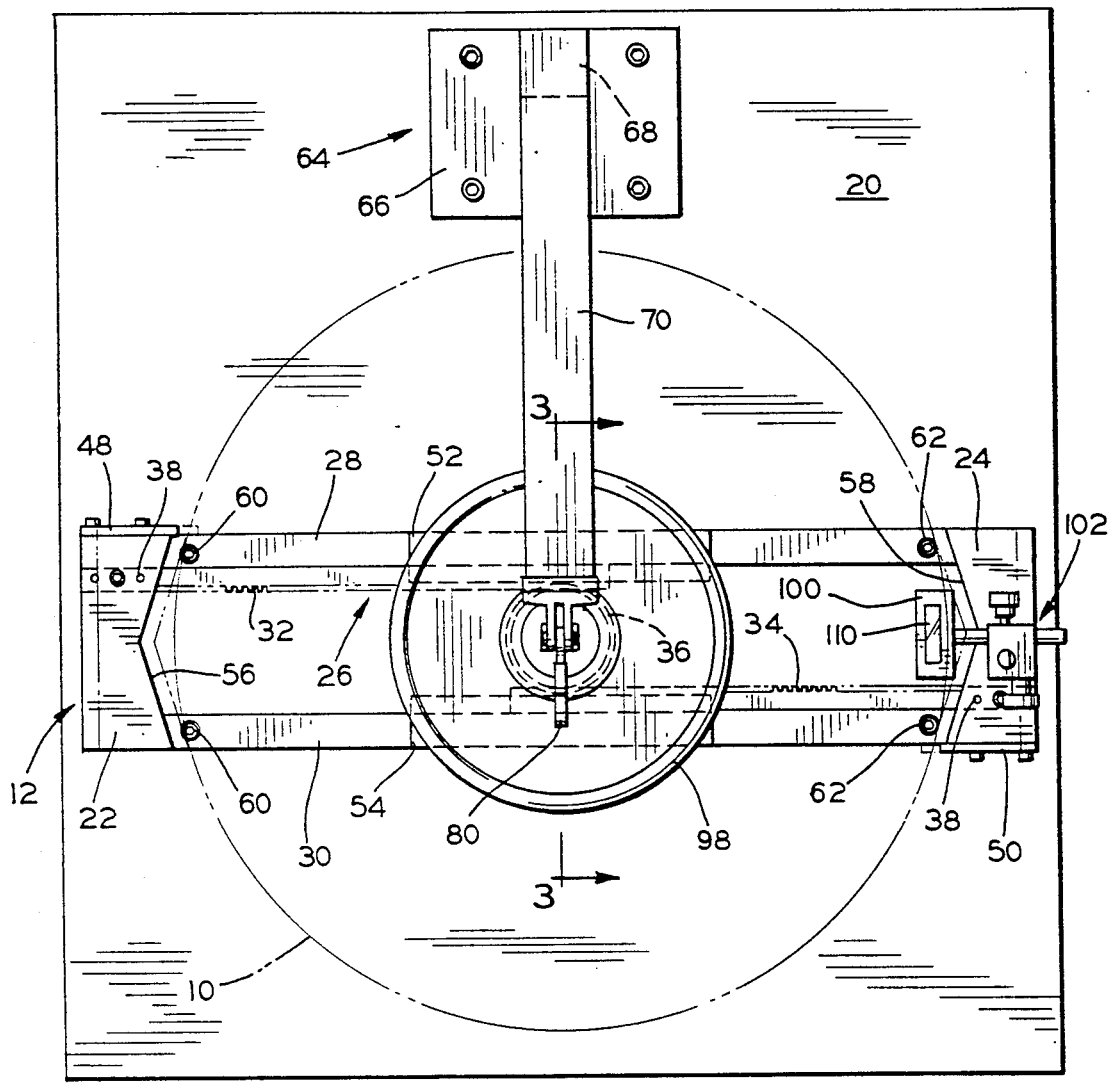
FIG. 1 is a top plan view of apparatus incorporating the present invention.
Figure 2:
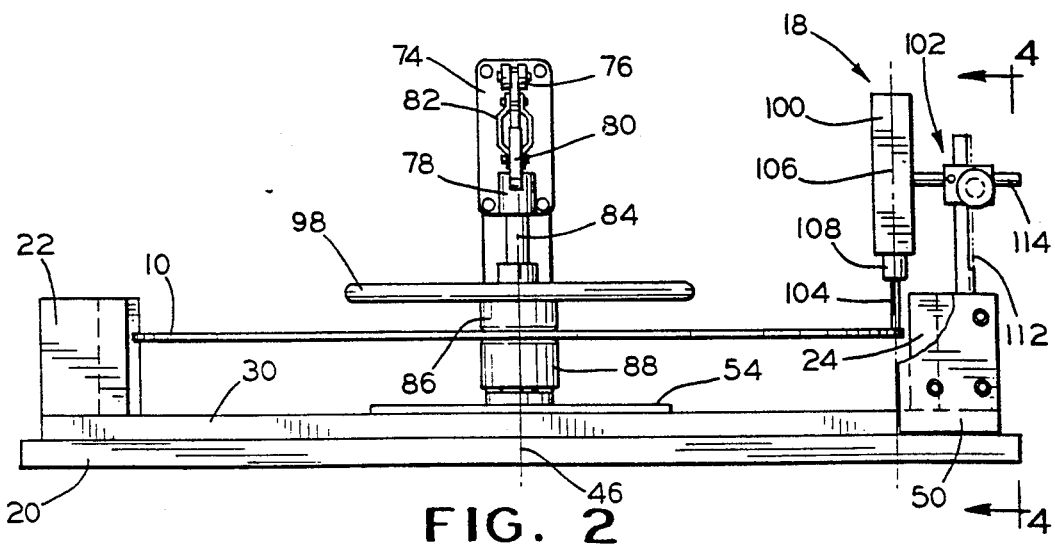
FIG. 2 is a side elevational view of the apparatus illustrated in FIG. 1 partially cutaway to show the clamping mechanism and the location of the contact probe and transducer on a disk-shaped object being tested.

FIGS. 1, 2 and 3 show a warp sensing apparatus according to the present invention. In determining the warp in a disk-shaped object 10 or the like, the disk-shaped object 10 is centered by a centering mechanism 12; is clamped into position for testing by a clamping device 14; is rotated by a manual rotation means 16; and is measured for warp displacement by a transducer sensor system 18.

With reference to the drawings, there is illustrated a warp sensing apparatus in accordance with the invention. More specifically, the apparatus includes a flat base 20 with a centering mechanism 12 mounted transversely thereon. The centering mechanism 12 consists primarily of a pair of spaced apart centering V-blocks 22 and 24 at the respective ends of the centering mechanism 12. The V-blocks 22 and 24 are attached to a rack and pinion system 26 suitable for imparting to and fro motion to the V-blocks 22 and 24.

The centering mechanism 12 includes a pair of spaced apart parallel side rails 28 and 30. The side rails are coextensive and extend transversely across the base 20. The side rails 28 and 30 are suitably secured to the base 20 by threaded fasteners, for example.

The teeth of a rack 32 are adapted to engage with the teeth of a pinion gear 36. The relative movement to and fro of rack 32 is guided by side rail 28. A second rack 34 is parallel and adjacent to the side rail 30 and engages the centering pinion gear 36 180° apart from rack 32 and extends in the opposite direction.

The V-block 22 is suitably secured on rack 32 and the V-block 24 is secured on rack 34. Both V-blocks 22 and 24 have mounting holes 38 drilled in the block for rack positioning pins 40 or threaded fasteners. The racks 32 and 34 have positioning pins 40 extending perpendicular from the racks 32 and 34 to properly position the V-blocks 22 and 24 for centering purposes.

The pinion gear 36 is mounted on a base spindle shaft 42 located midway between the side rails 28 and 30. The base spindle shaft 42 has One end secured in the base 20 and extends perpendicular from the base 20. A pinion gear hub 44 to secure the pinion gear 36 is also mounted on the base spindle shaft 42. The axis of rotation 46 for both the pinion gear 36 during centering and for the disk-shaped object 10 during testing extends perpendicular from the base 20 along the center line of the base spindle shaft 42. The V-blocks 22 and 24 are mounted equal distance from the axis of rotation 46.

The side plates 48 and 50 are secured to V-blocks 22 and 24, respectively, to ensure that the V-blocks 22 and 24 move only in a transverse direction along the side rails 28 and 30 during the centering process. The V-blocks 22 and 24 slidably engage the upper surface of side rails 28 and 30. The edge of side plate 48 extends beyond the edge of V-block 22 to engage the side surface of side rail 28. The side plate 50 is similarly secured to V-block 24 to engage side rail 30.

The tooth patterns on the racks 32 and 34 are identical. The racks 32 and 34 engage the teeth of the centering pinion gear 36 at points 180° apart on the outer edge of centering pinion gear 36. Consequently, the V-block 22 will move the same distance as V-block 24 when the V-blocks are moved in a transverse direction on side rails 28 and 30. When V-block 22 and rack 32 are moved towards the centering pinion gear 36, the rotation of the centering pinion gear 36 causes the V-block 24 and rack 34 to move an equal distance towards the centering pinion gear 36. Once the V-blocks 22 and 24 are aligned equal distance from the center of the centering pinion gear 36, the V-blocks 22 and 24 will remain equal distance from the axis of rotation 46 during centering operations.

The rack retainers 52 and 54 are fastened on the upper surface of side rails 28 and 30, respectively. The rack retainer 52 covers a segment of the rack 32 to prevent the rack 32 from moving perpendicular to the base 20 and disengaging the centering pinion gear 36. The rack retainer 54 covers a segment of the rack 34 to prevent the rack 34 from disengaging the centering pinion gear 36. Suitable means are typically provided to limit the transverse range of motion for the V-blocks 22 and 24 and prevent the racks 32 and 34 from disengaging the pinion gear 36. It has been found that satisfactory results may be achieved by receiving such motion limiting means to the base 20.

The side walls 56 and 58 of the V-blocks 22 and 24 facing the pinion gear 36 are provided with concave, V-shaped surfaces. The side wall 56 of V-block 22 engages the disk-shaped object 10 at two tangential points 60 and the side wall 58 of V-block 24 engages the disk-shaped object 10 at two additional tangential points 62. The rack and pinion system 26 is used to slide the V-blocks 22 and 24 along the side rails 28 and 30 until the V-blocks 22 and 24 engage and center the disk-shaped object 10 between a pair of equal and opposite points of engagement 60 and 62.

The clamping support mechanism 64 includes of a cantilever base plate 66 secured to base 20 with a support arm 68 extending perpendicular to the cantilever base plate 66. The support arm 68 is located outside the field of rotation for the disk-shaped object 10. A second support arm 70 extends from support arm 68 such that the clamping device 14 at the end of the support arm 70 is centered over the axis of rotation 46. A mounting bracket 72 is attached to the end of the support arm 70.

As shown in FIG. 3, the clamping device 14 mounted on the bracket 72 includes of a toggle clamp base 74 with a hinged mounting support 76 and a shaft support 78. The toggle clamp handle so is rotatably connected to the hinged mounting support 76 and rotates 90° from an open position when the handle 80 is generally perpendicular to the toggle clamp base 74 to a closed position when the handle 80 is parallel to the base 74. The toggle clamp connector bars 82 connect the toggle clamp handle so to the clamping spindle shaft 84. The shaft support 78 positions the center line of the clamping spindle shaft 84 on the axis of rotation 46.

The rotating means 16 includes a clamping spindle 86 and an associated base spindle 88 centered on the axis of rotation 46. A shaft bolt 90 secures the clamping spindle shaft 84 to a shaft coupling 92. The clamping spindle 86 is journaled to the shaft 84 by a set of ball bearings 94. When the toggle clamp handle 80 is closed, the clamping spindle shaft 84 moves the clamping spindle 86 towards the base spindle 88 to clamp the disk-shaped object 10. The clamping spindle 86 includes ball bearings 94 to allow the clamping spindle 86 to rotate about the clamping spindle shaft 84 in a plane parallel to the surface of the base 20.

The base spindle 88 is mounted on the base spindle shaft 42. The base spindle shaft 42 is press fit into the base 20 and extends perpendicularly therefrom through the pinion gear 36 and the pinion gear hub 44. The end of the base spindle shaft 42 engages the spindle bearings 96 of the base spindle 88. The base spindle shaft 42 is perpendicularly aligned with the clamping spindle shaft 84. The spindles 86 and 88 are rotatable about the same axis of rotation 46. The manual handwheel 98 has a center aperture for insertion on the clamping spindle 86 and is press fit to the clamping spindle 86 to ensure proper transfer of rotational force.

The sensor system 18 includes a transducer 100 with an adjustable mounting mechanism 102 for positioning the transducer 100 perpendicular to the base 20 on the outer edge of the disk-shaped object 10. The transducer 100 contains a spring-loaded contact probe 104 and a means to measure the displacement of the contact probe 104 along the center axis 106 of the transducer 100. One end of the contact probe 104 engages the surface of the disk-shaped object 10 at its outer edge and the other end extends into a contact probe housing 108 at the bottom of the transducer 100. The mechanical movement of the contact probe 104 in a direction perpendicular to the base 20 generates an electrical output signal. A transducer readout 110, such as an LED readout, receives the signal to indicate the displacement of the contact probe 104.

As shown in FIGS. 4 and 5, the adjustable mounting mechanism 102 for positioning the sensor system 18 is mounted on the V-block 24. A rack arm 112 is secured to a support arm 114 by an adjustment housing 116. The transducer 100 is mounted perpendicular to the base 20 on the end of the support arm 114 extending over the disk-shaped object 10. A set screw 118 is inserted into an aperture 120 on the adjustment housing 116 and the set screw 118 is tightened to hold the support arm 114 in the desired position.

The adjustable mounting mechanism 102 and sensor system 18 move transversely on the base 20 when the V block 24 is moved. The rack arm 112 has teeth formed in the face of the arm to engage a sensor pinion gear 122 mounted in the adjustment housing 116. The sensor pinion gear 122 includes a pinion shaft 124 extending from the center of the gear 122 through an aperture in the adjustment housing 116 An adjustment knob 126 is attached to the other end of the pinion shaft 124. Turning the adjustment knob 126 moves the pinion gear 122 up and down the rack arm 112.

A set knob 128 is located on the opposite side of the adjustment housing 116 from the adjustment knob 126. After the contact probe 104 is properly positioned, turning the set knob 128 in a clockwise direction advances the set screw 130 to engage the rack arm 112 and prevent the transducer 100 and contact probe housing 108 from moving during testing.

The warp sensing apparatus is operated to determine the displacement warp in a disk-shaped article 10 The four primary steps in the operation of the present invention are centering of the disk-shaped object 10, clamping of the disk-shaped object 10, positioning of the sensor system 18, and measurement of the displacement when rotating the disk-shaped object 10.

The centering mechanism 12 is opened to maximum width and a flat side of the disk-shaped object 10 is placed on the base spindle 88 between the V-blocks 22 and 24. The V-blocks 22 and 24 are moved towards the centering pinion gear 36 until the V-blocks 22 and 24 engage the disk-shaped object 10 at the points of engagement 60 and 62. When in this position, the disk-shaped object 10 is centered about the axis of rotation 46. The clamping device 14 is closed to clamp the disk-shaped object 10 between the base spindle 88 and the clamping spindle 86.

The contact probe 104 is spring loaded and adapted for axial movement within the associated housing 108. Initially, the distal end of the probe 104 is positioned to contact the upper surface of object 10 being tested. Vertical adjustment of the probe 104 is achieved by movement of the entire transducer 100 on the arm 112. Typically, the initial position of the transducer 100 is such that the probe 104 may be moved up or down by the contact with the surface of the object 10 being tested. Finally, the readout 110 is set at Zero to enable the operator to observe any Variance therefrom.

Once the sensor system 18 is set, the V-blocks 22 and 24 are disengaged from the disk-shaped object 10 such that the contact probe 104 still engages the surface of the disk-shaped object 10 near the edge of the object. After the V-blocks 22 and 24 have been disengaged, manually turning wheel 98 rotates the clamping spindle 86, the disk-shaped object 10 and the base spindle 88. As the disk-shaped object 10 rotates through a 360° cycle, the transducer 100 measures the displacement of the contact probe 104 and converts the displacement into a readout signal. The transducer 100 measures displacement in either direction and generates a positive and/or negative output signal to indicate both the direction and magnitude of the displacement. In addition to displaying displacement readings throughout the cycle, the readout 110 typically includes a memory to automatically retain the highest and lowest readings during the cycle to provide an accurate determination of the warp.

Those skilled in the art will understand that variations other than those specifically illustrated may be utilized without departing from the spirit of the invention. For example, a motor could be used to rotate the disk-shaped object 10 instead of using a wheel 98 with manual rotation. The output of the transducer 100 could be coupled to a remote readout instead of having the readout 110 integrally mounted in the top of the transducer 100. Other types of transducers could also be used to measure displacement.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A warp sensing apparatus for determining the warp in a disk-shaped object, comprising:
   a base;
   rotating means mounted on said base for securing and rotating the disk-shaped object about an axis of rotation perpendicular to the plane of the disk-shaped object;
   a centering mechanism for positioning the disk-shaped object on said rotating means, said centering mechanism including a rack and pinion system mounted on said base for positioning a first centering block and a second centering block to concurrently engage the disk-shaped object, the rack and pinion system having a first rack connected to the first centering block, a second rack in parallel, spaced-apart relationship with the first rack and connected to the second centering block, and a pinion gear disposed between and engaging the first rack and the second rack for concurrent movement of the centering blocks; and
   adjustable position sensor means for measuring undulations in the disk-shaped object as the disk-shaped object is rotated by said rotating means.

2. The warp sensing apparatus defined in claim 1 wherein the first centering block includes an engagement surface and the second centering block includes an engagement surface whereby the engagement surfaces are positioned and maintained 180 degrees apart and an equal distance from the center axis of the pinion gear.

3. The warp sensing apparatus defined in claim 1 wherein the first and the second centering blocks include a concave, V-shaped surface on a side of the centering blocks facing the pinion gear, the V-shaped surface for engaging an edge of the disk-shaped object and centering the disk-shaped object on said rotating means.

4. The warp sensing apparatus defined in claim 1 wherein said sensor means is connected to an adjustable mounting mechanism on the first centering block.

5. The warp sensing apparatus defined in claim 4 wherein the adjustable mounting mechanism includes a rack arm, pinion gear, and support arm whereby the position of the sensor means can be adjusted to engage the surface of the disk-shaped object.

6. A warp sensing apparatus for determining a warp in a disk-shaped object, comprising:

a base;

clamping means including a rotatable spindle mounted on a shaft extending perpendicular from said base, and a second rotatable spindle connected to a shaft of a toggle clamp mounted on a support arm;

rotating means mounted on one of the spindles, said rotating means including a wheel with a center aperture for spindle mounting;

a centering mechanism for positioning the disk-shaped object on said rotating means, said centering mechanism including a rack and pinion system mounted on said base for positioning a first centering block and a second centering block to concurrently engage the disk-shaped object, the rack and pinion system having a first rack connected to the first centering block, a second rack in parallel, spaced-apart relationship with the first rack and connected to the second centering block, and a pinion gear disposed between and engaging the first rack and the second rack for concurrent movement of the centering blocks;

sensor means, including a transducer with a contact probe and a readout, for measuring the displacement of the contact probe caused by undulations on a surface of the disk-shaped object; and a sensor positioning mechanism, including an adjustable arm, a set screw, and a support arm attached to the sensor means for positioning the contact probe of the transducer on the surface of the disk-shaped object whereby a disk-shaped object is centered, clamped between the spindles, and rotated such that the contact probe of the transducer is displaced perpendicular to the surface of the disk-shaped object by undulations in the disk-shaped object, and the magnitude and direction of such displacement is displayed on the transducer readout.

7. The warp sensing apparatus defined in claim 6 wherein the centering blocks include a concave V-shaped surface for engaging and centering the disk-shaped object.

8. The warp sensing apparatus defined in claim 6 wherein the first centering block includes a side plate to slidably engage an outer surface of the first rack, and the second centering block includes a side plate to slidably engage an outer surface of the second rack, for retaining the centering blocks in the desired position about the rack and pinion system.

9. The warp sensing apparatus defined in claim 6 wherein the rotatable spindles of said clamping means include ball bearings and a coupling device for shaft mounting.

* * * * *